US006955072B2

(12) United States Patent
Zarkar et al.

(10) Patent No.: US 6,955,072 B2
(45) Date of Patent: *Oct. 18, 2005

(54) SYSTEM AND METHOD FOR IN-SITU FLOW VERIFICATION AND CALIBRATION

(75) Inventors: Kaveh Zarkar, Andover, MA (US); Michael Frank L'Bassi, Sterling, MA (US); Mark James Quaratiello, Atkinson, NH (US)

(73) Assignee: MKS Instruments, Inc., Wilmington, MA (US)

(*) Notice: Subject to any disclaimer, the term of this patent is extended or adjusted under 35 U.S.C. 154(b) by 111 days.

This patent is subject to a terminal disclaimer.

(21) Appl. No.: 10/603,946

(22) Filed: Jun. 25, 2003

(65) Prior Publication Data

US 2004/0261492 A1 Dec. 30, 2004

(51) Int. Cl.[7] ............................................. G01F 25/00
(52) U.S. Cl. ...................... 73/1.36; 702/100; 73/1.34
(58) Field of Search ............................... 73/1.36, 1.34; 702/100, 113–115

(56) References Cited

U.S. PATENT DOCUMENTS

| | | | | |
|---|---|---|---|---|
| 4,328,697 A | * | 5/1982 | Tumber et al. | ........... 73/1.36 X |
| 4,331,262 A | * | 5/1982 | Snyder et al. | ............ 73/1.36 X |
| 5,479,812 A | * | 1/1996 | Juntunen et al. | ............. 73/1.34 |
| 5,726,358 A | * | 3/1998 | Kolling | ........................ 73/215 |
| 5,745,390 A | * | 4/1998 | Daneshgari | ............. 702/113 X |
| 5,856,929 A | * | 1/1999 | McClendon et al. | ........ 702/114 |
| 6,671,583 B2 | * | 12/2003 | Varone et al. | ............... 73/1.36 |
| 6,712,084 B2 | * | 3/2004 | Shajii et al. | ................... 137/12 |
| 6,832,166 B2 | * | 12/2004 | Schutzbach | ............. 702/100 X |
| 2003/0055589 A1 | * | 3/2003 | Mogadam | .................... 702/100 |
| 2004/0200260 A1 | * | 10/2004 | Klosterman et al. | ...... 73/1.36 X |

OTHER PUBLICATIONS

DeviceNet™ Technical Overview, Copyright 2001, Open DeviceNet, Vendor Association, Inc. (ODVA), pp X-XIV, month not given.
Tru-Flo™ Mass Flow Verifier Model GBR3A, Bulletin Tru-Flo-May 2001, © 2001 MKS Instruments, Inc., 4 pages.
DeviceNet ™ MFCs, Bulletin DNetMCFCs-Sep. 2002, © 2002 MKS Instruments, Inc., 4 pages.

(Continued)

Primary Examiner—Thomas P. Noland
(74) Attorney, Agent, or Firm—McDermott Will & Emery LLP

(57) ABSTRACT

A system and method for in-situ verification and calibration of flow control devices includes a first network physical layer connecting the flow control devices to a flow verification device. A controller of the flow verification device is programmed to communicate with each of the flow control devices through the first network physical layer, receive gas specific information and a transfer function from each of the flow control devices, and verify the flow of each flow control device. The controller of the flow verification device is further programmed to communicate with each of the flow control devices through the first network physical layer and, if necessary, calibrate the flow control devices. The verification and calibration of the flow control devices is preferably carried out based upon a single command provided through a tool controller connected to a second network physical layer connected to the flow control devices.

20 Claims, 2 Drawing Sheets

OTHER PUBLICATIONS

Gas Box Rate-Of-Rise In Situ Flow Verifier The GBROR™, Bulletin GBROR-Aug. 1999, © 1999 MKS Instruments, Inc., pp. 1-6.

Calibration for Accuracy & Repeatability, Calibration & Service Line Card -Mar. 2003, © 2003 MKS Instruments, Inc., 6 pages.

Blue Box Communications Manager, Bulletin BlueBoxComm--Apr. 2003, © 2003 MKS Instruments, Inc., 4 pages.

International Search Report PCT/04/16142 mailed Jun. 3, 2005.

Written Opinion PCT/US04/16142 mailed Jun. 3, 2005.

* cited by examiner

SYSTEM AND METHOD FOR IN-SITU FLOW VERIFICATION AND CALIBRATION

FIELD OF THE INVENTION

The present invention relates generally to semiconductor processing equipment and, more particularly, to systems and methods for delivering contaminant-free, precisely metered quantities of process and purge gases to a semiconductor process chamber. Even more particularly, the present invention relates to a system and a method for in-situ verification and calibration of flow controller devices.

BACKGROUND OF THE INVENTION

The fabrication of a single semiconductor device can require the careful synchronization and precisely measured delivery of as many as a dozen gases to a process chamber. Various recipes are used in the fabrication process, and many discrete processing steps where a semiconductor device is cleaned, polished, oxidized, masked, etched, doped, metalized, etc., may be required. The steps used, their particular sequence and the materials involved all contribute to the making of particular devices.

Accordingly, wafer fabrication facilities are commonly organized to include areas in which chemical vapor deposition, plasma deposition, plasma etching, sputtering and other similar gas manufacturing processes are carried out. The processing tools, be they chemical vapor deposition reactors, vacuum sputtering machines, plasma etchers or plasma enhanced chemical vapor deposition, must be supplied with various process gases. Pure gases must be supplied to the tools in contaminant-free, precisely metered quantities.

In a typical wafer fabrication facility the gases are stored in tanks, which are connected via piping or conduit to a gas box. The gas box delivers contaminant-free, precisely metered quantities of pure inert or reactant gases from the tanks of the fabrication facility to a process tool. The gas box, or gas metering system includes a plurality of gas paths having gas metering units, such as valves, pressure regulators and transducers, mass flow controllers and filters/purifiers. Each gas path has its own inlet for connection to separate sources of gas, but all of the gas paths converge into a single outlet, such as a gas manifold, for connection to the process tool.

It is desirable and often times necessary when delivering a gas in measured amounts to be able to obtain accurate measurements of gas flow conditions in gas delivery systems used to deliver such a gas, as for example, when testing the accuracy of or calibrating a mass flow controller. One way to accomplish this is by measuring the rate of change in temperature and pressure of a gas in a chamber of known volume and calculating mass flow from the measured values. According to this so-called "rate of pressure rise", or "rate-of-rise" (ROR) method, a gas flow is conducted through a device-under-test (DUT), such as a mass flow meter, into an evacuated, volume-calibrated chamber for a measured interval of time, $\Delta t$. The changes in pressure ($\Delta P$) and temperature ($\Delta T$) of the gas in the chamber are measured and corrected to a standard temperature ($T_0$) and pressure ($P_0$). The term "standard", as used herein, means "standard conditions", usually defined as an "absolute" temperature of 273.15K and an "absolute" pressure of 1 atmosphere. The gas flow rate can then be calculated from the change in pressure over time ($\Delta P/\Delta t$) and the change in temperature over time ($\Delta T/\Delta t$) in the known volume.

Many gas delivery systems employ gases which behave substantially as ideal gases. In other words, their behavior can be accurately predicted by and modeled in accordance with the ideal gas law, expressed as PV=nRT, where P is pressure, V is volume, n is the number of moles of the gas, R is the universal gas constant, and T is absolute temperature. The relationship between pressure change and temperature change of a substantially ideal gas in a fixed volume over time is constant regardless of the gas. Thus, the ideal gas law relationship can be used to determine n, the mass, i.e., the number of moles of gas in the chamber. In those situations in which gases behave differently from an ideal gas, correction functions can be used to render the measurement of pressure and temperature changes over time more accurate.

Some devices use the ROR method to verify flow. For example, U.S. Pat. No. 5,684,245 to Hinkle, which is assigned to the assignee of the present invention, discloses and claims an apparatus for and method of measuring mass flow of a gas in a gas delivery system using the ROR method. The assignee of the present invention, MKS Instruments Inc. of Andover, Mass., also provides ROR flow verifier products such as the Tru-Flo™ In-Situ Mass Flow Verifier, and the GBROR™ (gas box rate-of-rise) In-Situ Mass Flow Verifier.

What is still desired is a new and improved system and method for verifying and calibrating flow control devices in a gas metering system. Preferably, the new and improved system and method will employ a ROR flow verifier. In addition, the new and improved system and method will preferably provide in-situ verification and calibration of flow control devices, so that the verification and calibration does not require removal of the flow control devices from the gas metering system.

SUMMARY OF THE INVENTION

An exemplary embodiment of the present invention provides a system and method for in-situ verification and calibration of flow control devices that includes a first network physical layer connecting the flow control devices to a flow verification device. A controller of the flow verification device is programmed to communicate with each of the flow control devices through the first network physical layer, receive gas specific information and a transfer function from each of the flow control devices, and verify the flow of each flow control device. The controller of the flow verification device is further programmed to communicate with each of the flow control devices through the first network physical layer and, if necessary, calibrate the flow control devices. The verification and calibration of the flow control devices is preferably carried out based upon a single command provided through a tool controller connected to a second network physical layer connected to the flow control devices.

These and other features and advantages of the present disclosure will become more apparent to those of ordinary skill in the art after having read the following detailed descriptions of the preferred embodiments, which are illustrated in the attached drawing figures.

BRIEF DESCRIPTION OF DRAWINGS

Like reference characters designate identical or corresponding components and units throughout the several views.

DETAILED DESCRIPTION OF DISCLOSURE

Figure 4:
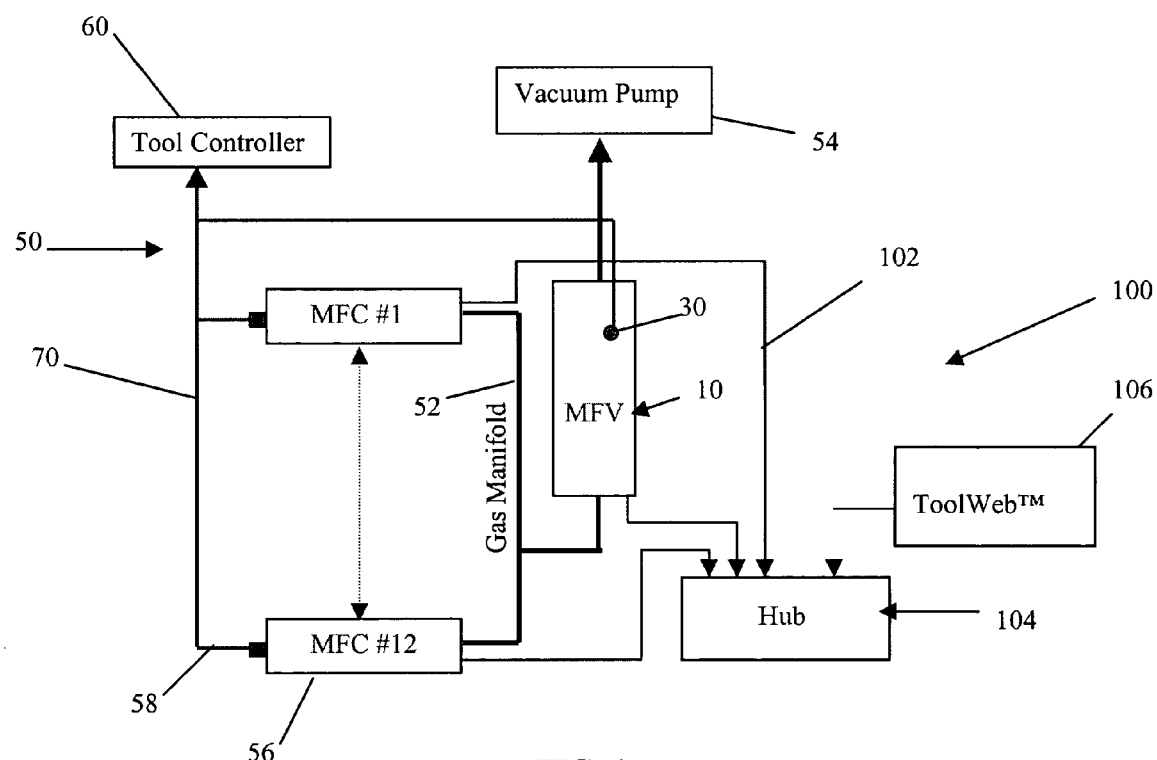
FIG. 4 is a schematic illustration of a gas metering system including an exemplary embodiment of a system according to the present disclosure for in-situ verification and calibration of the mass flow controllers.

Referring to FIG. 4, the present disclosure provides a system 100 and a method for in-situ verification and calibration of fluid flow through a device-under-test (DUT), such as a mass flow controller (MFC). The system 100 and method are particularly for use with gas metering systems for delivering contaminant-free, precisely metered quantities of process and purge gases to a semiconductor process chamber(s). In one exemplary embodiment, the new and improved system 100 and method employ a rate-of-rise (ROR) flow verifier. The new and improved system 100 and method provide in-situ verification and calibration of the MFCs, so that the verification and calibration does not require removal of the MFCs from the gas metering system.

Figure 1:
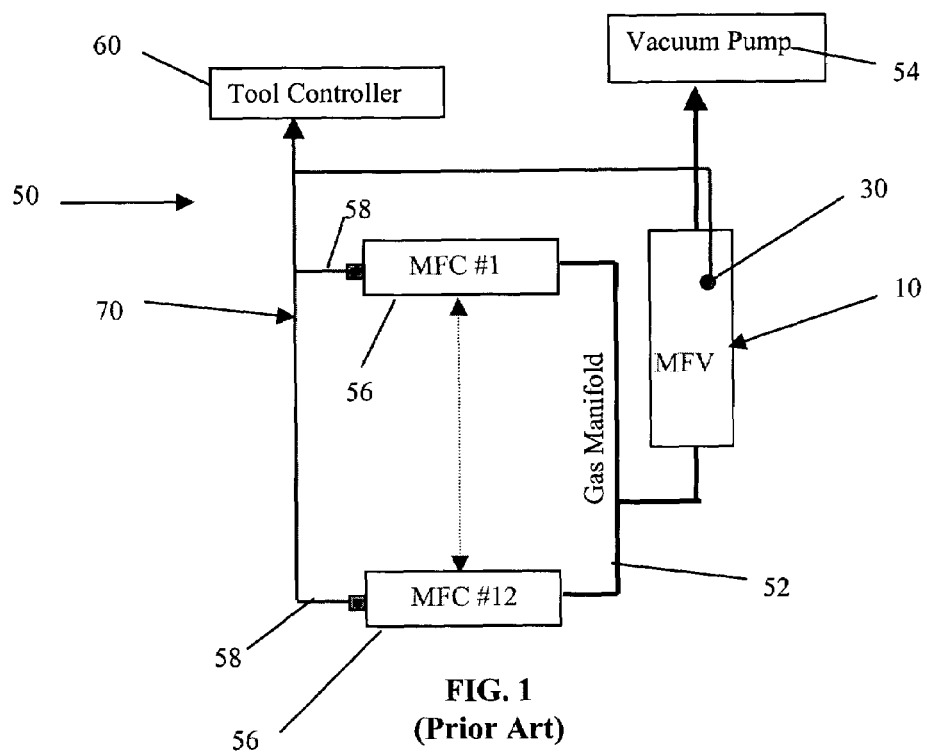
FIG. 1 is a schematic illustration of a gas metering system according to the prior art and including mass flow controllers connected to a gas manifold and a mass flow verifier connected between the gas manifold and a vacuum pump.
Figure 2:
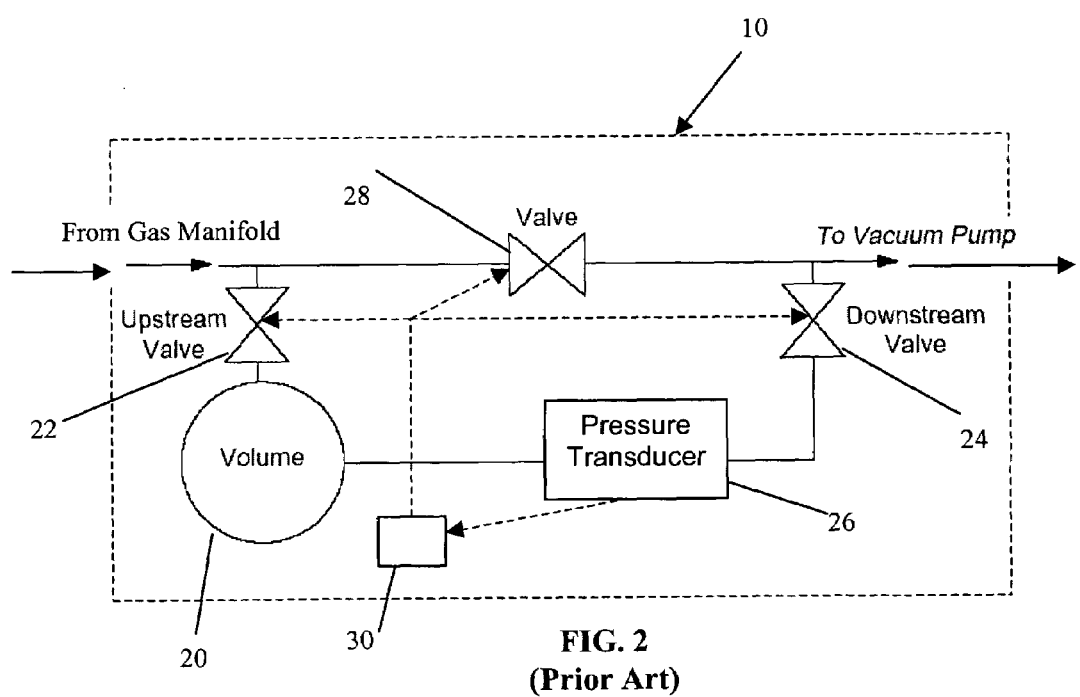
FIG. 2 is a schematic illustration of exemplary components of the mass flow verifier of FIG. 1.

Referring first to FIGS. 1 and 2, a flow verification device 10 of the prior art is shown. In FIG. 1, the flow verification device 10 is shown connected between a gas manifold 52 and a vacuum pump 54 of a gas metering system 50. The gas metering system 50 also includes a plurality of mass flow controllers (MFC) 56 controlling the flow of gas through lines 58 connected to the gas manifold 52. In the exemplary embodiment of FIG. 1, the system 50 includes twelve (12) lines 58 connected to the gas manifold 52 and having MFCs 56. The system 50, however, can include more or less than twelve (12) lines 58, as desired.

Preferably, but not necessarily, each of the MFCs 56 comprises a Pressure Insensitive type MFC (PiMFC) available from MKS instruments of Andover, Mass. (http://www.mksinst.com). The PiMFC includes technology improvements in functionality and performance to help users in semiconductor and high purity thin-film applications increase tool throughput and reduce overall system costs. In particular, the PiMFC provides real-time accurate flow control, that is insensitive to upstream and downstream pressure disturbances, through advanced physical modeling and digital control algorithms. The PiMFC enables real-time control of process gas flow, accuracy and repeatability is significantly improved over conventional digital based MFCs, resulting in better chamber matching. A pressure insensitive mass flow controller is also disclosed in co-pending U.S. patent application Ser. No. 10/178,721, filed Jun. 4, 2002, and now U.S. Pat. No. 6,712,084, for an Apparatus and Method for Pressure Fluctuation Insensitive Mass Flow Control, which is assigned to the assignee of the present invention and incorporated herein by reference.

The flow verification device 10 is used to verify the rate of flow produced by the MFCs. As shown in FIG. 2, the apparatus 10 includes a vessel 20 having a predetermined volume, an "upstream" or first valve 22 controlling flow between the gas manifold and the vessel 20, a "downstream" or second valve 24 controlling flow from the vessel 20 to the vacuum pump 14, and a vessel pressure measurement device 26 communicating with the volume of the vessel 20. The apparatus 10 can also include a bypass valve 28.

Figure 3:
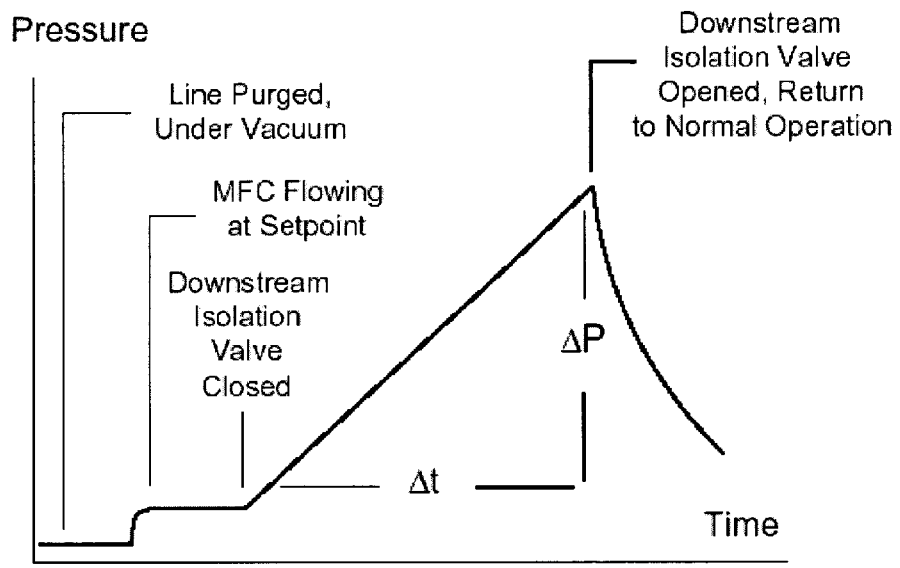
FIG. 3 is a graph of pressure versus time illustrating a method according to the prior art for verifying a flow rate of one of the mass flow controllers, as carried out by the mass flow verifier of FIG. 1.

A controller 30 of the flow verification device 10 utilizes the rate-of-rise method of flow verification, which is illustrated in FIG. 3 by the graph of pressure (P) versus time (t). In general, the controller 30 is a computer processor that includes electronic memory and a clock. The controller 30 is generally programmed so that, during operation, the controller first closes the bypass valve 28 and opens the first and the second valves 22, 24 so that flow is bypassed from the MFC 12 and through the vessel 20. The controller 30 is further programmed so that, after an initialization period to allow the bypassed flow to stabilize, the second valve 24 is closed to stop flow from the vessel 20. As the closed vessel 20 is filled with gas from the MFC 12, the controller 30 receives measurements of vessel pressure from the pressure measurement device 26, receives measurements of time from its clock, and determines a rate of change in vessel pressure due to the gas flow. The controller 30 then determines an actual flow provided by the MFC 12 using the rate of change in vessel pressure and the known volume of the vessel 20. The graph of FIG. 3 illustrates how the gas flow rate can be calculated by the controller 30 from the change in pressure over time ($\Delta P/\Delta t$) in the known volume of the vessel 20.

After the flow measurement is made, the first valve 22, shown in FIG. 2, is closed and the second valve 24 is opened to purge the vessel 20 with the vacuum pump 14. After purging, the second valve 24 is closed and the bypass valve 28 is opened to allow normal flow between the MFC 12 and the process chamber 18.

The flow verification device 10 can comprise, for example, a GBROR™ in-situ flow verifier or a Tru-Flo™ in-situ flow verifier, both of which are provided by MKS Instruments of Andover, Mass. (http://www.mksinst.com). The GBROR™ is a modular gas path, or stick, and includes the valves, the pressure vessel, the pressure transducer and the controller mounted on a manifold. The GBROR™ and the Tru-Flo™ flow verifiers are both process transparent, i.e., operate between the normal processing steps of the gas delivery system, and thus reduce processing tool down time. The pressure measurement device 26 can comprise, for example, a Baratron® brand pressure transducer, which is also available from MKS Instruments.

Referring again to FIG. 1, the computer controllers (not shown) of the MFCs 12 and the computer controller 30 of the flow verification device 10 are connected through a network physical layer 70 to a tool control 60. In one exemplary embodiment, the network physical layer comprises a DeviceNet™ network physical layer 70. DeviceNet™ is a simple, networking solution that reduces the cost and time to wire and install industrial devices, while providing interchangeability of "like" components for multiple vendors. DeviceNet™ is an Open Network Standard, having an open specification and protocol. Vendors are not required to purchase hardware, software or licensing rights to connect devices to a system using DeviceNet™. A DeviceNet™ specification can be obtained from the Open DeviceNet™ Vendor Association, Inc. (www.odva.org). The DeviceNet™ physical layer 70 allows the interchangeability of simple devices while making interconnectivity of more complex devices possible. The DeviceNet™ physical layer 70 is based on a broadcast-oriented, communications protocol; the Controller Area Network (CAN). In 1996, over 10 million CAN chips were produced. There are four main CAN chip suppliers; Intel, Motorola, Phillips and Hitachi. Two primary purposes of the DeviceNet™ physical layer 70 are: 1.) Transport of control-oriented information associated with low-level devices, and 2.) Transport of other information which is indirectly related to the system being controlled, such as configuration.

In order to verify flow through one of the MFCs 56, the tool controller 60 individually controls the flow verification device 10 and a selected one of the MFCs 56 through the DeviceNet™ physical layer 70, so that a flow rate of the selected MFC 56 is verified.

Referring now to FIG. 4, the new and improved system 100 of the present invention provides in-situ verification and calibration of the MFCs 56, so that the verification and calibration does not require removal of the MFCs 56 from the gas metering system 50. The system 100 includes a first network physical layer 104 connecting each of the MFCs 56 and the flow verification device 10 to a hub 104, which in turn can be connected to a connectivity tool 106.

The computer controller 30 of the flow verification device 10 is newly programmed to automatically communicate with each of the MFCs 56 and verify and, if necessary, calibrate the flow of each of the MFCs 56 over the first network physical layer 104. In particular, all gas specific information along with a transfer function (to provide pressure insensitivity) is requested from the computer controller 30 of the flow verification device 10 from each of the MFCs 56 and processed to verify the accuracy of the flow rate of each of the MFCs 56 using the previously described ROR technique. This communication is done via the first network physical layer 104 between the flow verifier device 10 and the MFCs 56.

The in-situ flow verification and calibration is initiated by a single command from the tool control controller 60 over the "second" physical layer 70. In the exemplary embodiment shown, the second network physical layer comprises a DeviceNet™ network physical layer 70, although other protocols can be used. In one mode of operation, flow verify data will be collected and transmitted via the DeviceNet™ network physical layer 70 to the tool controller 60. In a different mode of operation, the computer controller 30 of the flow verification device 10 will be programmed to receive a single command from the tool controller 70 and will query the MFC 56 under test, verify the flow and recalibrate the MFC, if necessary, and upload the calibration parameters into the MFC. This sequence can continue for all the MFCs 56 in the gas metering system 50 and as frequently as required. All the vital calibration data will be resident on the each of the MFCs 56.

In one exemplary embodiment of the present invention, the first network physical layer comprises an EtherNet/IP network physical layer 104. EtherNet/IP is an industrial networking standard that takes advantage of commercial off-the-shelf Ethernet communication chips and physical media. IP stands for 'industrial protocol' and is what distinguishes this network. Unlike many options in the industrial Ethernet crowd, EtherNet/IP uses an open protocol at the application layer. Further, more than one vendor or organization backs EtherNet/IP, and EtherNet/IP is the only standard supported by three networking organizations: ControlNet International (CI), the Industrial Ethernet Association (EA) and the Open DeviceNet™ Vendor Association (ODVA).

EtherNet/IP is a protocol stack extending commercial off-the-shelf Ethernet with an open, industrially proven protocol for automation purposes. At the same time, it supports common office protocols such as HTTP, FTP and SNMP. Based on the TCP/IP suite, EtherNet/IP uses TCP for information messaging and UDP for I/O messaging. By using both TCP/IP and UDP/IP to encapsulate data, this is the first industrial Ethernet network to provide real-time I/O control.

A companion network to DeviceNet™, EtherNet/IP uses the same open, robust application-layer protocol—the Control and Information Protocol (CIP)—as DeviceNet™. Consequently, the networks also share device profiles and an object library. This allows EtherNet/IP developers to use the DeviceNet™ objects and profiles for plug-and-play interoperability among devices from multiple vendors. Combined, DeviceNet™ and EtherNet/IP promote transparency from sensors to the enterprise software.

In accordance with a further exemplary embodiment of the present invention the hub is further connected to a ToolWeb™. ToolWeb™ is a software "Connectivity" solution available from MKS Instruments that allows connection to all the programs on Process Tools via the Ethernet/IP network. BlueBOX™ is a hardware communications manager available from MKS Instruments that can support ToolWeb™ for data collection and routing. Multiple tools could be connected to the ToolWeb™ via the EtherNet/IP network physical layer 104 and could publish collected data over to a third party database connected through the hub to the EtherNet/IP network physical layer 104. In general, ToolWeb™ is a system containing hardware, such as the BlueBOX™ communications manager, and software to make the data monitoring and collection for the purpose of e-diagnostics possible.

While there have been illustrated and described particular embodiments of the present disclosure, it will be appreciated that numerous changes and modifications will occur to those skilled in the art. Accordingly, it is intended that the appended claims cover all those changes and modifications which fall within the spirit and scope of the present disclosure.

What is claimed is:

1. A system for in-situ verification and calibration of flow control devices, comprising:
    a flow verification device;
    a first network physical layer for connecting the flow control devices to the flow verification device; and
    a second network physical layer connected to the flow verification device;
    wherein a controller of the flow verification device is programmed to verify and, if necessary, calibrate the flow control devices over the first network physical layer based upon a single command provided through the second network physical layer.

2. A system according to claim 1, wherein the first network physical layer comprises an EtherNet/IP network physical layer.

3. A system according to claim 1, wherein the second network physical layer is based on a broadcast-oriented, communications protocol.

4. A system according to claim 1, wherein the flow verifier is a rate-of-rise flow verifier.

5. A system according to claim 4, wherein the flow verifier is a modular in-situ flow verifier.

6. A system according to claim 4, wherein the flow verifier is a process transparent, in-situ flow verifier.

7. A system according to claim 1, further comprising flow control devices connected to the first network physical layer.

8. A system according to claim 7, wherein the flow control devices comprise pressure insensitive type mass flow controllers.

9. A system according to claim 1, further comprising a hub connected to the first network physical layer.

10. A system according to claim 9, wherein the hub comprises a communications manager that can support connectivity software for data collection and routing.

11. A method for in-situ verification and calibration of flow control devices, comprising:
   connecting a flow verification device to the flow control devices through a first network physical layer;
   connecting a second network physical layer to the flow verification device; and
   programming a controller of the flow verification device to verify and, if necessary, calibrate the flow control devices over the first network physical layer based upon a single command provided through the second network physical layer.

12. A method according to claim 11, wherein the first network physical layer comprises an EtherNet/IP network physical layer.

13. A method according to claim 11, wherein the second network physical layer is based on a broadcast-oriented, communications protocol.

14. A method according to claim 11, wherein the flow verifier is a rate-of-rise flow verifier.

15. A method according to claim 14, wherein the flow verifier is a modular, in-situ flow verifier.

16. A method according to claim 14, wherein the flow verifier is a process transparent, in-situ flow verifier.

17. A method according to claim 11, wherein the flow control devices comprise pressure insensitive type mass flow controllers.

18. A method according to claim 11, further comprising connecting a hub to the first network physical layer.

19. A method according to claim 18, wherein the hub comprises a communications manager that can support connectivity software for data collection and routing.

20. A method according to claim 11, wherein the flow verification device is put in fluid communication with the flow control devices through a gas manifold.

* * * * *